(12) United States Patent
Handal (10) Patent No.: US 7,076,770 B2
(45) Date of Patent: Jul. 11, 2006

(54) APPARATUS AND METHOD FOR MODIFYING A KERNEL MODULE TO RUN ON MULTIPLE KERNEL VERSIONS

(75) Inventor: Thomas Handal, San Diego, CA (US)

(73) Assignee: Computer Associates Think, Inc., Islandia, NY (US)

( * ) Notice: Subject to any disclaimer, the term of this patent is extended or adjusted under 35 U.S.C. 154(b) by 172 days.

(21) Appl. No.: 10/761,543

(22) Filed: Jan. 20, 2004

(65) Prior Publication Data

US 2004/0221275 A1    Nov. 4, 2004

Related U.S. Application Data

(63) Continuation of application No. 10/418,769, filed on Apr. 17, 2003, now abandoned.

(60) Provisional application No. 60/373,120, filed on Apr. 17, 2002.

(51) Int. Cl.
*G06F 9/45* (2006.01)

(52) U.S. Cl. ............... 717/136; 717/146; 717/162; 716/18

(58) Field of Classification Search ............ 717/136, 717/146, 162; 703/23, 28; 716/18
See application file for complete search history.

(56) References Cited

U.S. PATENT DOCUMENTS

| | | | |
|---|---|---|---|
| 5,359,730 A | | 10/1994 | Marron |
| 6,199,203 B1 | | 3/2001 | Saboff |
| 6,219,828 B1 | * | 4/2001 | Lee ........................ 717/129 |
| 6,477,683 B1 | * | 11/2002 | Killian et al. ............ 716/1 |
| 6,760,888 B1 | * | 7/2004 | Killian et al. ............ 716/1 |
| 2002/0019972 A1 | | 2/2002 | Grier et al. |

OTHER PUBLICATIONS

StarOS a Multiprocessor Operating System for the Support of Task Forces, ACM, 1979, pp. 117-127.*
Distributed Operating System, Andrew S. Tanenbaum et al, ACM, 1986, pp. 419-470.*
Clarity MCode : A Retargetable Intermediate Representation for Compilation, Brian T. Lewis et al, SunMicroSystems, May 1995, 20 pages.*
JADE: A High Level Machine-Independnet Language for Parallel Programming, Martin C. Rinard et al, IEEE, 1993, pp. 28-38.*
M. Segal, "On-The-Fly Program Modification: Systems For Dynamic Updating", IEEE Sofware, IEEE Computer Society, vol. 10, No. 2, pp. 53-65, Mar. 1993.

* cited by examiner

*Primary Examiner*—Todd Ingberg
(74) *Attorney, Agent, or Firm*—Baker Botts L.L.P.

(57)    ABSTRACT

A method and an apparatus for adapting for a kernel on a target system a compiled kernel module corresponding to another kernel version which is different from the kernel on the target system are provided. A kernel analyzer extracts from the kernel on the target system an error check measure and a kernel version identification. A module adaptation component inserts in the compiled kernel module an error check parameter corresponding to the error check measure extracted by the kernel analyzer from the kernel on the target system, and replaces a version identification in the compiled kernel module with the kernel version identification extracted by the kernel analyzer from the kernel on the target system.

21 Claims, 4 Drawing Sheets

APPARATUS AND METHOD FOR MODIFYING A KERNEL MODULE TO RUN ON MULTIPLE KERNEL VERSIONS

CROSS-REFERENCE TO RELATED APPLICATION

This application is a Rule 1.53(b) continuation of application Ser. No. 10/418,769, filed Apr. 17, 2003 now abandoned, and claims the benefit of U.S. provisional application Ser. No. 60/373,120, filed Apr. 17, 2002 and entitled "APPARATUS AND METHOD FOR MODIFYING A KERNEL MODULE TO RUN ON MULTIPLE KERNEL VERSIONS", which is incorporated in its entirety herein by reference.

TECHNICAL FIELD

This application relates to computer operating systems. In particular, the application relates to adapting a kernel module for an operating system kernel of a target system.

DESCRIPTION OF RELATED ART

An operating system is one or more computer programs (for example, collections of computer instructions that guide a computer to perform one or more tasks) that make operating computer hardware usable. DOS, Windows, Mac, UNIX and Palm are some families of operating systems.

The primary function of operating systems is management of the computer's resources. The resources may include, for example, processor(s), storage (such as memories, hard disks, etc.), input/output devices (such as printers, monitor displays, etc.), and communication devices (such as modems, network interfaces, etc.). Resource management tasks include, for example, providing sharing of data and other resources by multiple users, handling handshaking and other network communication tasks, etc.

Operating system functions such as resource management are typically performed in a manner that is transparent to the average computer user. For example, although most users do not realize it, an operating system serves as an interface between computer resources on the one hand and, on the other hand, application programs (such as word processors, spreadsheets, web browsers, etc.) which a user may use. Operating systems also have other functions, such as providing a user interface, securing access and data against unauthorized users, recovering from system errors, etc.

An operating system kernel is the nucleus or core component of an operating system. Functions of a kernel may include process management, interprocess communication, interrupt processing, support for storage allocation/deallocation, support for input/output activities, system security measures, etc. Each of these functions includes many tasks. For example, security tasks may include access control, logging and monitoring, storage and file system management, and network and modem communications monitoring, etc.

Linux is a member of the family of UNIX operating systems, and may be run on a variety of computer platforms, including personal computers with an x86 processor. Linux is a free, open-ended implementation of UNIX. Specifically, source code for a Linux kernel is widely available to the public, and is continuously being improved and otherwise modified. As improvements and/or other alterations to the Linux kernel are made and generally adopted by the public, new Linux versions are released. A publicly-released Linux kernel version is identifiable by a corresponding assigned kernel version identification.

A Linux kernel, similar to some other operating system kernels, typically consists of a plurality of kernel modules. A kernel module is a program for performing one or more corresponding kernel tasks. A kernel version may be a combination of kernel modules selected according to the particular system on which the kernel version is to be installed. Two kernel versions may be different in that (a) one version has additional modules that are not in the other version and/or (b) two modules of the respective versions perform the same task(s) but in different (but perhaps equally satisfactory) ways.

When a new kernel module is added to (or replaces an existing module in) an operating system kernel, the kernel with the new module may need to be recompiled. Compilation of a kernel is a time-consuming task. For operating systems such as Linux in which multiple kernel versions are actively-used, a new (for example, firewall) kernel module may undergo multiple kernel compilations, corresponding to the plural (custom or publicly released) kernel versions to which the new module may be added.

Linux provides for dynamic linking of loadable kernel modules. Even when a kernel uses dynamically linkable kernel modules, each dynamically linkable kernel module is compiled into a loadable module. Although a kernel into which a new dynamically linkable kernel module may be loaded may not need to be recompiled, the new dynamically linkable kernel module typically is compiled multiple (under some circumstances, hundreds of) times, each compilation providing a corresponding loadable module to which a respective (released or custom) kernel version may dynamically link. The multiple compilations are time consuming and cause much unnecessary storage consumption.

SUMMARY

This application provides a kernel module modification apparatus for adapting for a kernel on a target system a compiled kernel module corresponding to another kernel version which is different from the kernel on the target system. In one embodiment, the apparatus includes a kernel analyzer and a module adaptation component. The kernel analyzer extracts from the kernel on the target system an error check measure and a kernel version identification. The module adaptation component inserts in the compiled kernel module an error check parameter corresponding to the error check measure extracted by the kernel analyzer from the kernel on the target system, and replaces a version identification in the compiled kernel module with the kernel version identification extracted by the kernel analyzer from the kernel on the target system.

The application also provides methods for adapting for a kernel on a target system a compiled kernel module corresponding to another kernel version which is different from the kernel on the target system. The method, according to one embodiment, includes extracting from the kernel on the target system an error check measure and a kernel version identification, inserting in the compiled kernel module an error check parameter corresponding to the error check measure extracted from the kernel on the target system, and replacing a version identification in the compiled kernel module with the kernel version identification extracted from the kernel on the target system. The compiled kernel module into which the error check parameter is inserted may be a loadable Linux kernel module and/or binary. The modified, compiled kernel module having inserted therein the error check parameter and bearing the kernel version identification extracted from the kernel on the target system is loadable into the kernel on the target system.

According to another embodiment, the error check measure may include one or more checksums extracted from the kernel on the target system. The method may further include locating a symbol table in the compiled kernel module and, for each symbol name in the symbol table, performing an analysis of the symbol name. The symbol name analysis may include comparing the symbol name to symbols in the kernel on the target system. If the symbol name is matched to a symbol in the kernel on the target system, a checksum associated with the matched symbol may be extracted and appended to the symbol name in the symbol table of the compiled kernel module. The method may also include adjusting one or more offsets of the symbol table after the symbol names are analyzed.

BRIEF DESCRIPTION OF THE DRAWINGS

The features of the present application can be more readily understood from the following detailed description with reference to the accompanying drawings wherein.

DETAILED DESCRIPTION

This application provides tools (in the form of methods and apparatuses) for modifying a kernel module to run on multiple kernel versions. The tools may be embodied in a software utility (for example, one or more computer programs) stored on a computer readable medium and/or transmitted via a computer network or other transmission medium. The computer or computer system on which the software utility is executed may be the target system.

Figure 1:
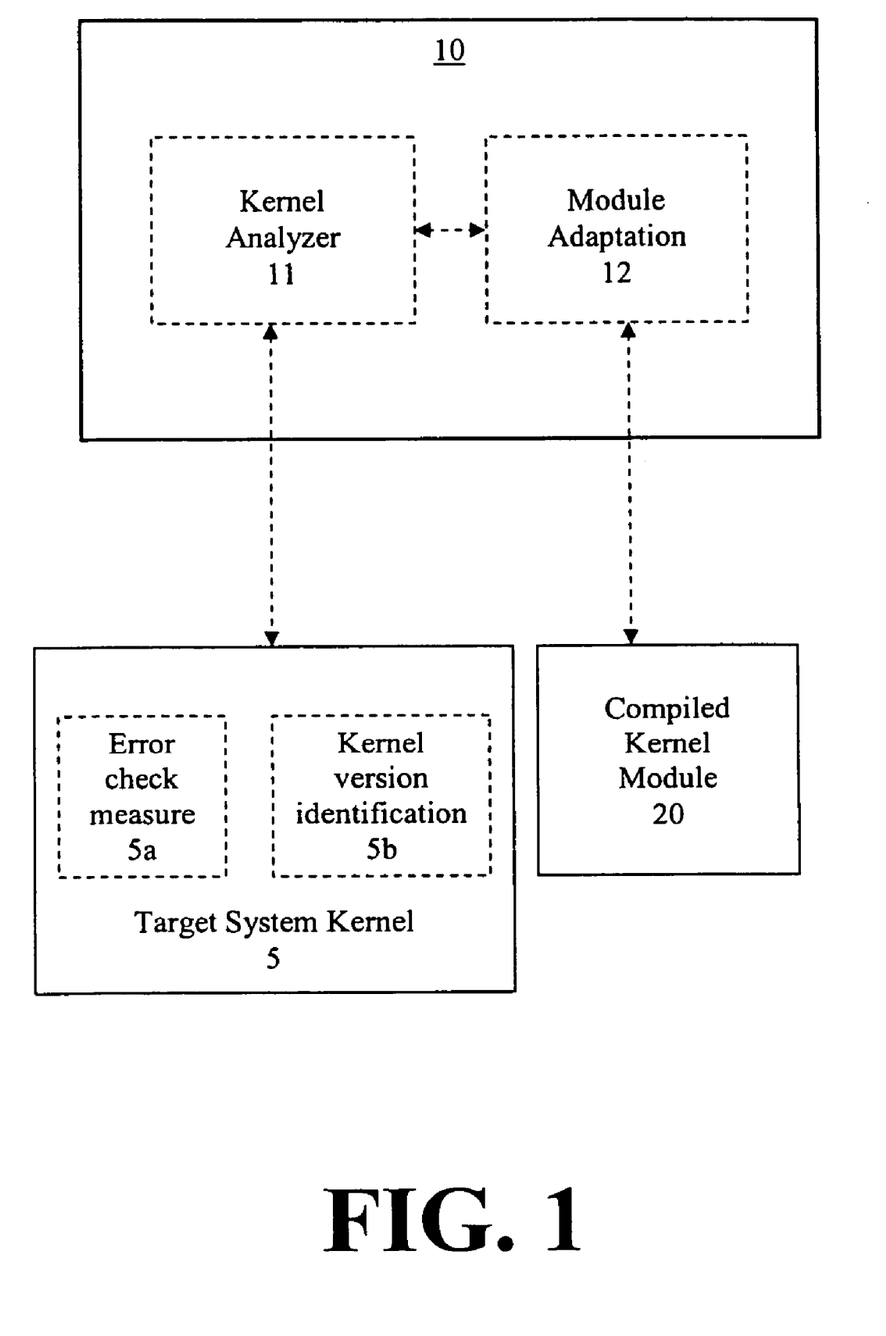
FIG. 1 shows a block diagram of a kernel module modification apparatus, according to one embodiment of the present application.

A kernel module modification apparatus 10, according to an embodiment shown in FIG. 1, adapts for a kernel on a target system a compiled kernel module corresponding to another kernel version which is different from the kernel on the target system. The apparatus 10 includes a kernel analyzer 11 and a module adaptation component 12. The kernel analyzer and the module adaptation component may be modules or code sections in a software utility.

Figure 2:
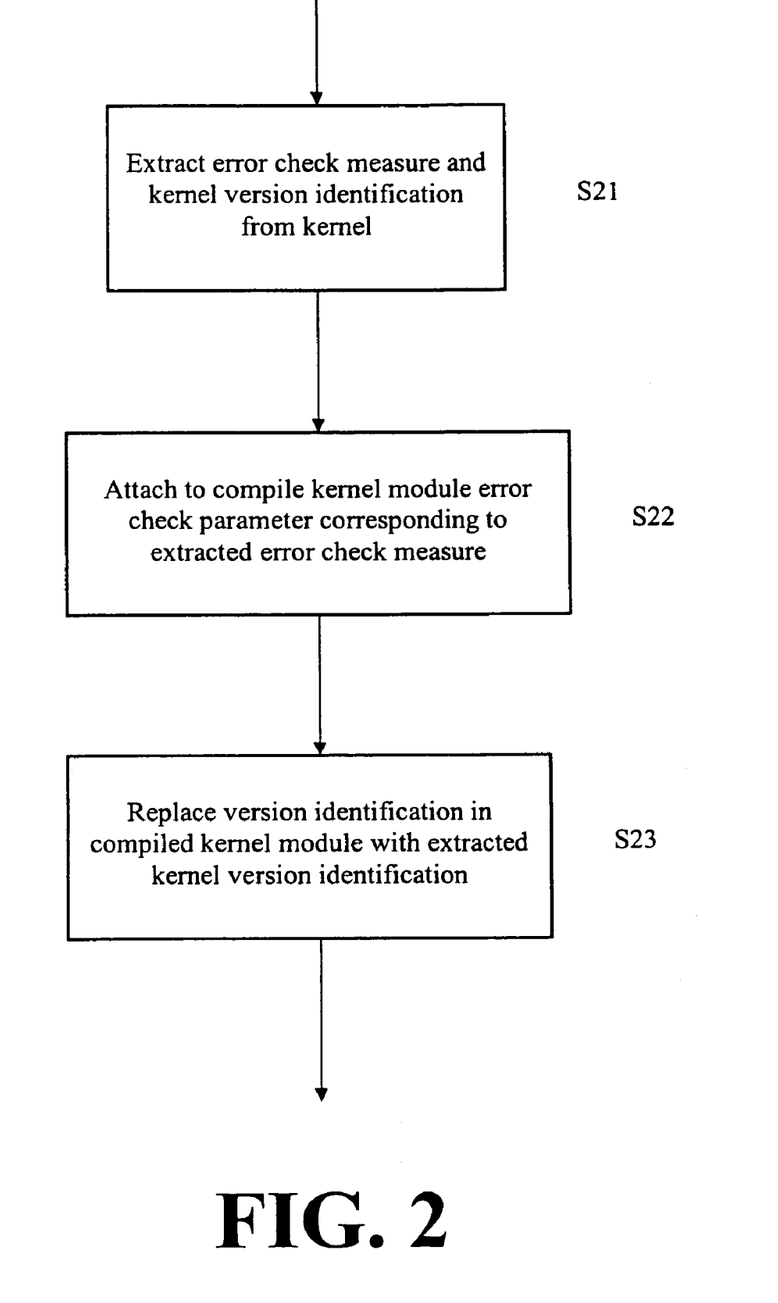
FIG. 2 shows a flow chart of a method, according to one embodiment of the present application, for adapting for a kernel on a target system a compiled kernel module corresponding to another kernel version which is different from the kernel on the target system.

A method for adapting for a kernel on a target system a compiled kernel module corresponding to another kernel version which is different from the kernel on the target system, according to one embodiment, is described with reference to FIGS. 1 and 2. The kernel analyzer component 11 extracts from the target system kernel 5 an error check measure 5a and a kernel version identification 5b (step S21). The module adaptation component 12 inserts in the compiled kernel module 20 an error check parameter corresponding to the error check measure extracted by the kernel analyzer from the kernel on the target system (step S22), and replaces a version identification in the compiled kernel module 20 with the kernel version identification extracted by the kernel analyzer from the kernel on the target system (step S23).

The compiled kernel module into which the error check parameter is inserted may be a loadable Linux kernel module and/or binary. The modified, compiled kernel module having inserted therein the error check parameter and bearing the kernel version identification extracted from the kernel on the target system is loadable into the kernel on the target system.

The version identification extracted from the target system kernel may be a version number or another version identification (such as one or more symbols).

The error check measure extracted from the target system kernel may be one or more checksums. When the error check measure is a checksum, the error check parameter that is inserted in the compiled kernel module may be identical or complementary to the error check measure, or otherwise derived from it. Checksum methodologies are well known in the art. For the sake of clarity, this disclosure does not provide a detailed discussion of such methodologies. In any event, the modified kernel module, with the error check parameter obtained based on the error check measure extracted from the target system kernel, should meet the error check criteria of the kernel.

An exemplary embodiment for a Linux kernel is explained below. It should be understood, however, that the subject matter of the present disclosure may be applied to other types of operating system kernels.

The kernel module modification apparatus may be a software utility for modifying a compiled Linux Kernel module of a certain kernel version and producing a modified kernel module adapted for loading into a different kernel version on a target system. The modifications include changes to a symbol table in a symbol table header of the kernel module and to a version identification in the module information section of the kernel module.

Linux kernel modules may be compiled into a format called Executable and Linkable Format (ELF). The ELF format has many sections and headers that describe proper execution and linkage information for the module/executable. The sections include the symbol table and module information sections.

A symbol table in a compiled kernel module is a list of identifiers (i.e. symbols, for example, names, labels, etc.) used in the kernel module, the locations of the identifiers in the module, and identifier attributes. In the symbol table of a Linux kernel module, a checksum is appended onto the end of each symbol name. The checksum value may be used to verify that the kernel module uses the same symbol prototypes, processor opcodes, etc., when the module is being inserted into a target kernel. If these values are different, the kernel determines that there are unresolved symbols and aborts the process of loading the kernel module. To work around this problem, checksums may be removed from the symbols in the kernel module and replaced with checksums that are stored in the target kernel. The checksum replacement allows the module to be loaded without any unresolved symbol errors.

Figure 3:
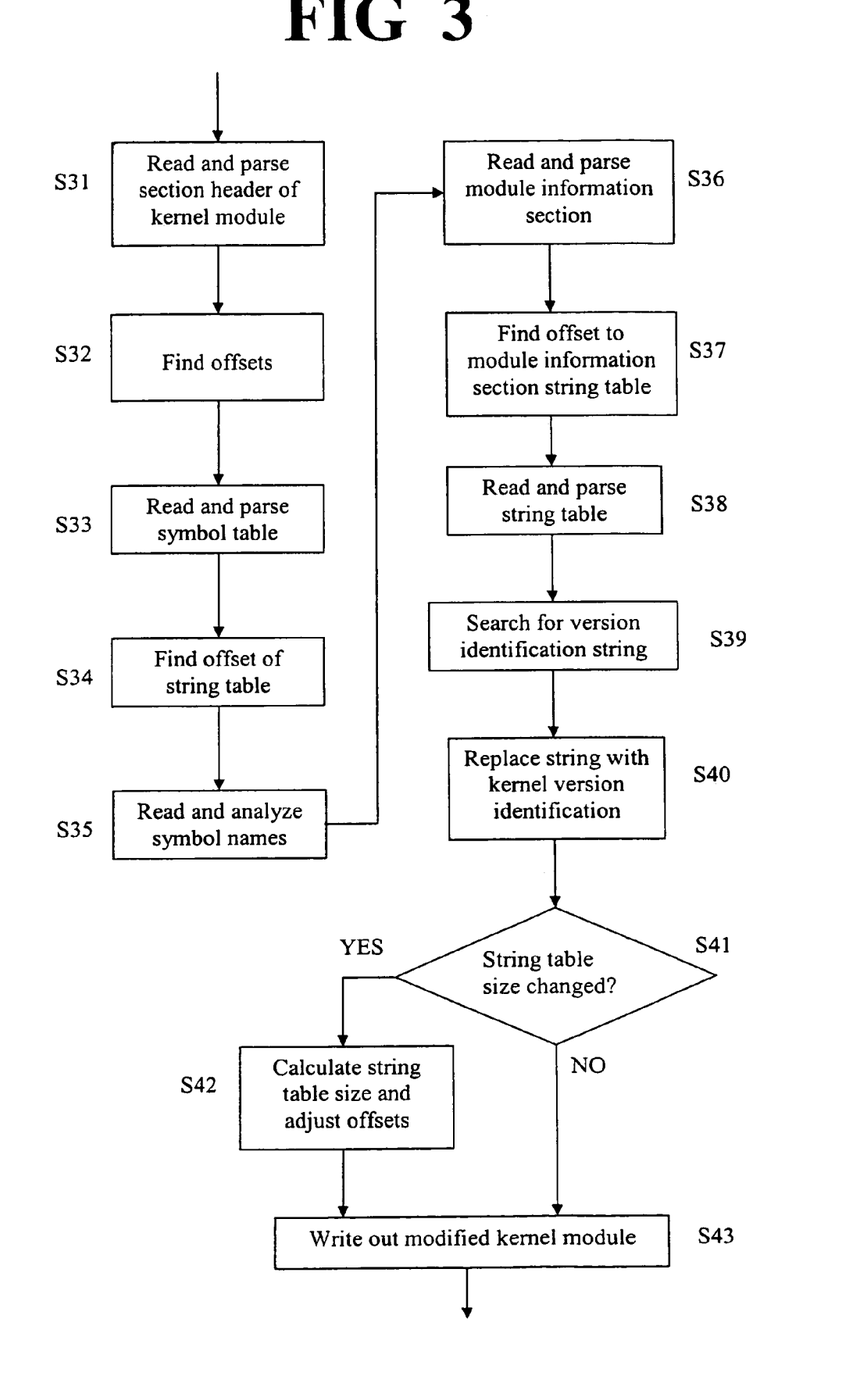
FIG. 3 shows a flow chart of a method for adapting for a Linux kernel on a target system a compiled Linux kernel module corresponding to another Linux kernel version, according to one embodiment of the present application.

A method for, adapting for a Linux kernel on a target system a compiled Linux kernel module corresponding to another Linux kernel version is described below with reference to FIGS. 3 and 4.

The section header of the ELF format kernel module is read and parsed by the utility (step S31). The utility finds, based on the section header information, an offset of the symbol table in the kernel module and the offset is used to locate the symbol table in the kernel module (step S32). The symbol table is then read and parsed by the utility (step S33). An offset to where symbol names are stored in the module, which is called a "string table", is determined from the symbol table information (step S34) The symbol names are then read and analyzed one at a time from the string table (step S35).

Figure 4:
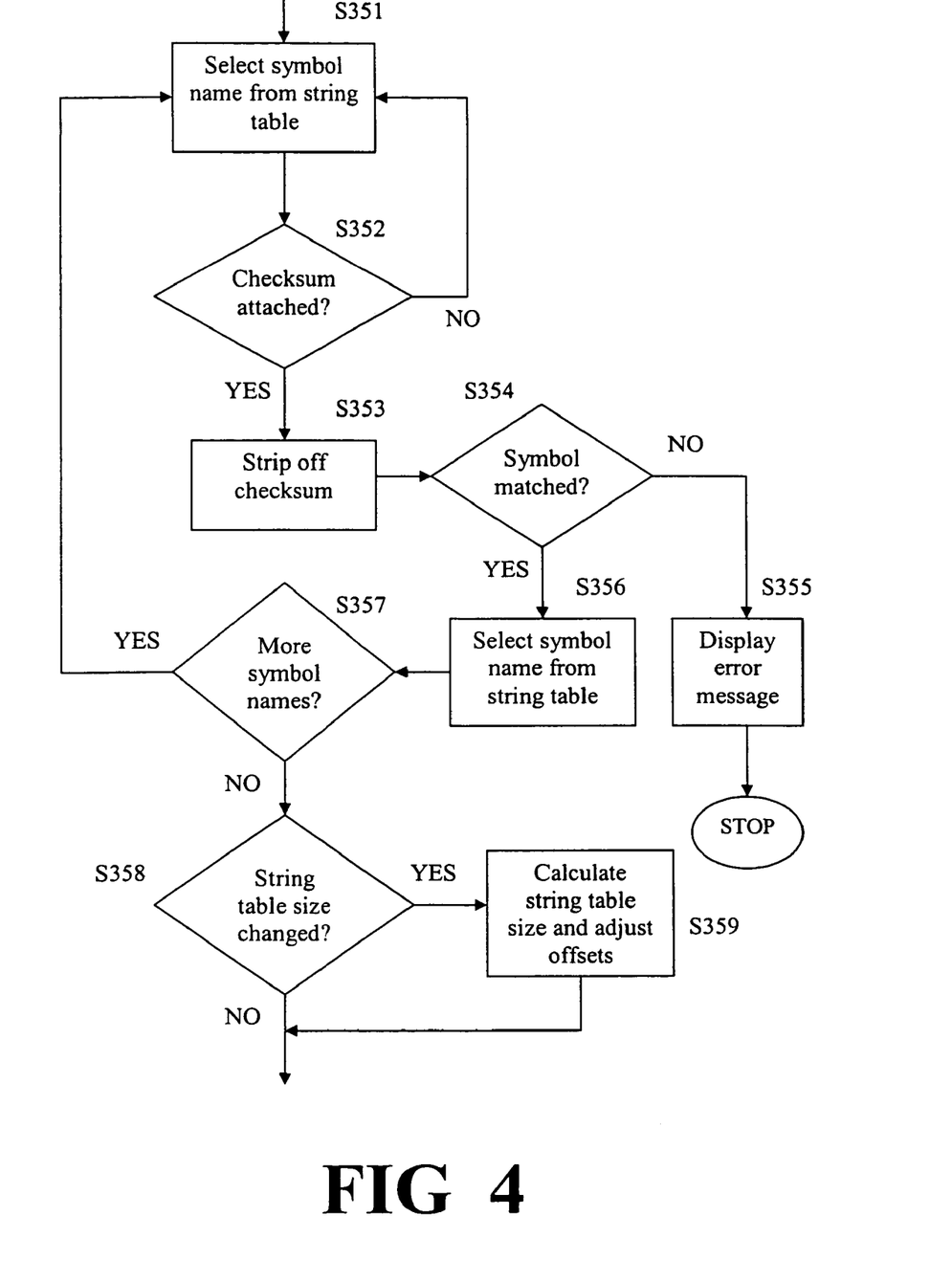
FIG. 4 shows a flow chart of a method for analyzing symbol names, according to one embodiment of the present application.

The analysis of symbol names in the string table may be performed in the following way (FIG. 4). A symbol name in the string table is selected (step S351). The selected symbol name is checked to determine whether a checksum is attached (step S352). If no checksum is found (step S352), the symbol name is skipped and the next symbol name is selected. If the symbol name includes an attached checksum (step S352), then the checksum is stripped off (step S353) and the remaining name is then compared to symbols that are in the kernel on the target system (step S354). If a match is found (step S354), a checksum appended to the matched symbol in the target system kernel is extracted and appended to the selected symbol name in the string table of the kernel module (step S355). If a match is not found (step S354), an error message is generated, indicating that there is an unresolved symbol (step S356), and the symbol name analysis procedure does not proceed. Otherwise, the process continues until all of the symbol names have been checked and modified (step S357). If a modification to the string table has taken place (step S358), the size of the string table may have changed. Therefore, the offsets of the ELF format header may need to be adjusted to reflect the change in string table size (step S359).

The following pseudo-code describes this process:

```
WHILE MORE SYMBOLS
    IF SYMBOL CONTAINS CHECKSUM
        STRIP CHECKSUM FROM SYMBOL
        SEARCH RUNNING KERNEL FOR STRIPPED SYMBOL
        IF MATCH FOUND
            APPEND CHECKSUM FOUND ONTO SYMBOL NAME
            STORE SYMBOL NAME WITH NEW CHECKSUM IN NEW MODULE
            RECORD SIZE CHANGE OF SYMBOL
        ELSE
            DISPLAY ERROR AND EXIT
        END IF
    END IF
END WHILE
MODIFY ELF FORMAT HEADER OFFSETS TO REFLECT STRING TABLE SIZE
CHANGE
```

Next, the module information section is modified. The module information section holds information identifying the kernel version for which the kernel module was compiled. Embedded in the module information is a version identification, which is replaced by the kernel version identification of the kernel on the target system. Modification of the version identification allows the kernel module to be loaded into the kernel on the target system without kernel version mismatch error messages.

The ELF format parsing (step S31), described above, also yields an offset to the module information section of the module (step S32). The module information section is read and parsed (step S36) to find an offset to a string table (different from the symbol names string table) associated with the module information section (step S37). The module information string table is read and parsed (step S38). The string table is then searched for the version identification. For example, in a compiled Linux kernel module, the version identification follows the string "kernel_version=" (step S39). When this string is found, the version identification of the kernel version for which the Linux kernel module was compiled follows the "=" sign. Next, the version identification is replaced with the kernel version identification of the target system which may be obtained, for example, from an "uname" system. call on the target system (step S40). The version identification modification may change the string table size (step S41). Therefore, the string table size may need to be recalculated and the ELF header offsets modified to reflect a change in string table size (step S42).

The modified kernel version string is written out as the new kernel module (step S43). The modified kernel module is loadable into the kernel on the target system.

The following source code is for an exemplary software utility.

```
/*****************************************************/
/* Linux Kernel Module Modification program to allow a  */
/* kernel module compiled for another kernel version to */
/* insert and run on the current kernel version.        */
/* The kernel versions may be fairly close.             */
/* Also, it is checked that the                         */
/* kernel subsystem that is being utilized has not changed */
/* much between the two versions that this module is being */
/* modified too and from.                               */
/*                                                      */
/* File      : modify.c                                 */
/*                                                      */
```

-continued

```
/* Compile : gcc modify.c get_Ksym.c -o mod             */
/* Usage   : ./mod <old_module> <new_module> mod        */
/*****************************************************/
#include <stdio.h>
#include <stdlib.h>
#include <string.h>
#include <fcntl.h>
#include <sys/types.h>
#include <sys/stat.h>
#include <sys/utsname.h>
#include <elf.h>
#include <unistd.h>
char * getKsym ( char * );
```

-continued

```
/****************************************************************
    readDataFromFile
    This function takes a file descriptor, offset and size
    as arguments. It basically allocates a buffer of size
    "size" and then goes to the specified "offset" of the
    file descriptor and copies reads into the buffer from
    the file descriptor.
    Returns a pointer to the newly allocated buffer with
    the data.
****************************************************************/
void * readDataFromFile ( int fd, off_t offset, size_t bytes )
{
    void * buffer;
    buffer = (void *) malloc ( bytes );
    if ( ! buffer )
        return NULL;
    if ( lseek ( fd, offset, SEEK_SET ) != offset )
    {
        perror("lseek");
        free ( buffer );
        return NULL;
    }
    if ( read ( fd, buffer, bytes ) != bytes )
    {
        perror ( "read" );
        free ( buffer );
        return NULL;
    }
    return buffer;
}
/* Symbol structure to keep track of symbols
 * during modification of symbol table
 */
struct symbol_type
{
    char name[256];
    unsigned int old_index;
    unsigned int new_index;
};
int main ( int argc, char * argv[ ] )
{
    int fd;
    FILE * log_fp;
    int I, k;
    Elf32_Ehdr * hdr;
    Elf32_Shdr * shdr;
    Elf32_Sym * symtab;
    int symtab_string_link;
    char * symtab_strings, * symtab_strings2;
    char * elf_names, * modinfo;
    int symtab_strings_size, new_symtab_strings_size, modinfo_size;
    int offset = 0, size = 0, curindex;
    char * ptr;
    struct symbol_type * new_strings;
    int file_delta, modinfo_delta;
    char * entire_file, * new_file;
    struct stat buf;
    int symtab_offset_index, modinfo_offset_index;
    /* Check proper number of arguments */
    if ( argc < 3 )
    {
        printf("\nUsage : %s module new_module\n\n", argv[0] );
        return 1;
    }
    /* Open the log file */
    log_fp = fopen ( "mod.log", "w" );
    if ( ! log_fp )
    {
        perror("fopen : mod.log");
        return 1;
    }
    /* Start the log file header */
    fprintf (log_fp, "\n*************************************\n");
    fprintf (log_fp, "Starting Modification of %s\n", argv[1] );
    fprintf (log_fp, "*************************************\n");
    fprintf (log_fp, "\nInput File : %s\nOutput File : %s\n\n",
argv[1], argv[2]);
    /* Open the original kernel module for reading */
    fd = open ( argv[1], O_RDONLY );
    if ( fd < 0 )
    {
        perror ("open");
        fclose ( log_fp );
        return 1;
    }
    /* Read the ELF Header data */
    if ( ( hdr = ( Elf32_Ehdr * ) readDataFromFile ( fd, 0, sizeof
( Elf32_Ehdr ) ) ) == NULL )
    {
        fclose ( log_fp );
        close ( fd );
        return −1;
    }
    /* Read the ELF Section Header data */
    shdr = ( Elf32_Shdr * ) readDataFromFile ( fd, hdr −> e_shoff,
hdr−>e_shentsize * hdr−>e_shnum );
    /** First, the .modinfo section where the kernel_version is
held is modified **/
    /* Read the string table for the section headers */
    elf_names = ( char * ) readDataFromFile ( fd, shdr[hdr−
>e_shstrndx] .sh_offset,
                                             shdr[hdr−
>e_shstrndx].sh_size );
    printf("\nModifying Kernel Version Information . . .\n");
    fprintf(log_fp,"\nModifying Kernel Version Information . . . \n");
    /* Search the section header table for ".modinfo" section */
    for ( i = 0; i < hdr−>e_shnum; i++ )
    {
        if ( strcmp ( elf_names + shdr[i] .sh_name, ".modinfo" ) == 0
)
        {
            struct utsname buf;
            char * modinfo_data, * old_ptr, * new_ptr;
            modinfo_size = 0;
            modinfo_offset_index = i;
            /* Grab the current kernel version */
            if ( uname ( &buf ) )
            {
                perror ( "uname");
                return 1;
            }
            /* Get some memory and read module string table into it */
            new_ptr = modinfo = ( char * ) malloc ( strlen (
buf.release ) + shdr[i] .sh_size );
            modinfo_data = ( char * ) readDataFromFile ( fd,
shdr[i] .sh_offset,
shdr[i] .sh_size );
            ptr = modinfo_data;
            /* Find the kernel_version string in the string table */
            while ( ptr < ( modinfo_data + shdr[i] .sh_size ) )
            {
                if ( strstr ( ptr, "kernel_version=" ) )
                {
                    /* String found, so replace with buf.release from
uname */
                    sprintf ( new_ptr, "kernel_version=%s", buf.release );
                    new_ptr += strlen ( "kernel_version=" ) + strlen (
buf.release ) + 1;
                    modinfo_size += strlen ( "kernel_version=" ) + strlen (
buf.release ) + 1;
                }
                else
                {
                    strcpy ( new_ptr, ptr );
                    new_ptr += strlen ( ptr ) + 1;
                    modinfo_size += strlen ( ptr ) + 1;
                }
                ptr += strlen ( ptr ) + 1;
            }
            fprintf (log_fp, "Changing Kernel Version :
kernel_version=%s\n", buf.release );
            /* Calculate string table size difference */
            modinfo_delta = modinfo_size − shdr[i] .sh_size;
            break;
        }
    }
    fprintf(log_fp, "Modinfo Delta : %d\n", modinfo_delta);
    /** find the symbol table **/
```

```
        printf("\nModifying Symbol Table Information . . . \n");
        fprintf(log_fp,"\nModifying Symbol Table Information . . . \n\n" );
        for ( i = 0; i < hdr->e_shnum; i++ )
            if ( shdr [i] .sh_type == SHT_SYMTAB )
            {
                symtab_offset_index = i;
                symtab_string_link = shdr[i] .sh_link;
                break;
            }
        /* Found the symbol table, so read the symbol table string
table */
        symtab_strings = ( char * ) readDataFromFile ( fd,
shdr [symtab_string_link] .sh_offset,
shdr [symtab_string_link] .sh_size );
        symtab_strings_size = shdr[symtab_string_link] .sh_size;
        symtab = ( Elf32_Sym * ) readDataFromFile ( fd;
shdr[i] .sh_offset, shdr[i] .sh_size );
        close ( fd );
        /* Allocate space for the symbol structure so we may keep track
of the symbols */
        new_strings = ( struct symbol_type * ) malloc ( 5000 * sizeof (
struct symbol_type ) );
        ptr = symtab_strings;
        offset = 0;
        i = 0;
        size = 0;
        new_symtab_strings_size = 0;
        /* Go through the symtab strings and compare them to the ones
in the kernel */
        while ( ptr < symtab_strings +
shdr [symtab_string_link] .sh_size )
        {
            char * it = ( char * ) 0x1;
            /* Look for the symbol structure associated with symbol name
to see
             * if this symbol is undefined . . . If it is undefined, then
             * it is matched to the kernel . . . If it is defined, it is
part of the module,
             * so we leave it alone . . .
             */
            for ( k = 0; k < shdr[symtab_offset_index] .sh_size / sizeof (
Elf32_Sym ) ; k++ )
                if ( symtab[k] .st_name == (int) ( ptr - symtab_strings ) )
                    if ( ELF32_ST_TYPE ( symtab[k] .st_info ) ==
STT_NOTYPE )
                    {
                        it = getKsym ( ptr );
                        break;
                    }
            /* If the symbol was not found as UNDEF (STT_NOTYPE), then we
take the
             * original symbol name.
             */
            if ( it == ( char * ) 0x1 )
                it = ptr;
            if ( ! it )
            {
                printf("\nUnresolved Symbol . . . %s\nExiting . . . \n\n", ptr );
                fprintf(log_fp, "\nUnresolved Symbol . . . %s\nExiting . . . \n\n",
ptr );
                return 1;
            }
            /* Store them away in a temporary spot, one by one */
            strcpy ( new_strings [i] .name, it );
            new_symtab_strings_size += strlen ( it ) + 1;
            /* Store in the log the change we made */
            if ( strcmp ( it, ptr ) != 0 )
            {
                fprintf(log_fp, "%-30s -> %-30s\n", ptr, it );
                free ( it );
            }
            new_strings [i++] .old_index = size;
            size += strlen ( ptr ) + 1;
            ptr += strlen ( ptr ) + 1;
        }
        /* Now that we have our own copy of the symbols with new
checksums, we dont need the original string table */
        free ( symtab_strings );
        /* Now we create our own version of symtab_strings, to put in
our new module */
        symtab_strings2 = ( char * ) malloc ( new_symtab_strings_size *
sizeof ( char ));
        memset ( symtab_strings2, 0, new_symtab_strings_size * sizeof (
char ) );
        ptr = symtab_strings2;
        curindex = 0;
        for ( offset = 0; offset < i; offset++ )
        {
            strcpy ( ptr + curindex, new_strings [offset] .name );
            new_strings [offset] .new_index = curindex;
            curindex += ( strlen ( ptr + curindex ) + 1 );
        }
        /** Fix up the symbol table indeces for the name table in the
            symtab section header
         **/
        for ( k = 0; k < shdr[symtab_offset_index] .sh_size / sizeof (
Elf32_Sym ); k++ )
        {
            if ( symtab[k] .st_name != 0 )
            {
                int index;
                for ( index = 1; index < i; index++ )
                    if ( symtab[k] .st_name == new_strings [index] .old_index )
                        symtab[k] .st_name = new_strings [index] .new_index;
            }
        }
        /* Calculate the new size of the string table */
        file_delta = new_symtab_strings_size - symtab_strings_size;
        fprintf(log_fp, "\nSymtab Strings Delta : %d\n", file_delta );
        /** We now have all of the new symbol names with new checksums,
         * and also the new kernel version . . .
         * We are now going to write out the new module
         */
        /* Read the entire old module, so we can spot modify */
        fd = open ( argv[1], O_RDONLY );
        stat ( argv[1], &buf );
        entire_file = ( char * ) malloc ( buf.st_size );
        read ( fd, entire_file, buf.st_size );
        close ( fd );
        free ( hdr );
        free ( shdr );
        /* Set the pointers for the ELF Header and Section Header */
        hdr = (Elf32_Ehdr * ) entire_file;
        shdr = (Elf32_Shdr *) (entire_file + hdr -> e_shoff);
        /** set the new size of the symtab string table **/
        shdr[symtab_string_link] .sh_size = new_symtab_strings_size;
        /** Copy over the new symbol string table over the old one **/
        memcpy ( ( char * ) entire_file +
shdr[symtab_string_link] .sh_offset,
                ( char * ) symtab_strings2, new_symtab_strings_size );
        /** Copy over the new symtab section header, with the new
offsets **/
        memcpy ( ( char * ) entire_file +
shdr[symtab_offset_index] .sh_offset,
                ( char * ) symtab, shdr[symtab_offset_index] .sh_size
);
        /** Allocating memory for a new file, including size for
possible
         * growth of string table for the module info section and
         * symbol table sections
         **/
        new_file = ( char * ) malloc ( buf.st_size + file_delta +
modinfo_delta );
        /** Copy over the portions of the file, piece by piece. */
        memcpy ( new_file, entire_file,
shdr[modinfo_offset_index] .sh_offset );
        memcpy ( new_file + shdr[modinfo_offset_index] .sh_offset,
modinfo, modinfo_size );
        memcpy ( new_file + shdr[modinfo_offset_index] .sh_offset +
modinfo_size,
                 entire_file + shdr[modinfo_offset_index] .sh_offset +
                     shdr[modinfo_offset_index] .sh_size,
                 buf.st_size - shdr[modinfo_offset_index] .sh_offset -
                     shdr[modinfo_offset_index] .sh_size );
        /** Change the offsets for the section headers . . . **/
        hdr = (Elf32_Ehdr * ) new_file;
        /* Find the new section header table offset */
        if ( shdr[symtab_string_link] .sh_offset < hdr -> e_shoff )
```

-continued

```
      hdr -> e_shoff += file_delta;
      if ( shdr[modinfo_offset_index] .sh_offset < hdr -> e_shoff )
         hdr -> e_shoff += modinfo_delta;
      /* Grab the section header table */
      shdr = (Elf32_Shdr *) (new_file + hdr -> e_shoff);
      /* Modify the size of the modinfo section size,
         since we changed the kernel version */
      shdr[modinfo_offset_index] .sh_size += modinfo_delta;
      /* Modify the rest of the section header offsets */
      for ( i = 0 ; i < hdr->e_shnum ; i++ )
      {
         if ( shdr[symtab_string_link] .sh_offset < shdr[i] .sh_offset )
            shdr[i] .sh_offset += file_delta;
         if ( shdr[modinfo_offset_index] .sh_offset < shdr[i] .sh_offset
)
            shdr[i] .sh_offset += modinfo_delta;
      }
      fprintf(log_fp, "\nSection Header Offsets modified . . . \n");
      /** Open up and output the new module **/
      fd = open ( argv[2], O_WRONLY | O_CREAT | O_TRUNC );
      if ( fd < 0 )
      {
         perror ("open");
         return 1;
      }
      write ( fd, new_file, buf.st_size + file_delta + modinfo_delta
);
      close ( fd );
      /** Free all of our memory **/
      free ( new_file );
      free ( new_strings );
      free ( entire_file );
      free ( modinfo );
      free ( elf_names );
      /** Work is done ;-) . . . New module now runs on current kernel
**/
      printf("\n%s -> %s Completed . . . \n\n", argv[1], argv[2] );
      fprintf(log_fp,"\n%s -> %s Completed . . . \n\n", argv[1], argv[2]
);
      fclose (log_fp);
      return 0;
}
/*************************************************************/
/* Linux Kernel Module Modification program to allow a       */
/* kernel module compiled for another kernel version to      */
/* insert and run on the current kernel version.             */
/* The kernel versions may be fairly close.                  */
/* Also, it should be checked that the                       */
/* kernel subsystem that is being utilized has not changed   */
/* much between the two versions that this module is being   */
/* modified too and from.                                    */
/*                                                           */
/* File : get_Ksym.c                                         */
/*                                                           */
/* Compile : gcc modify.c get_Ksym.c -o mod                  */
/* Usage : ./mod <old_module> <new_module>                   */
/*************************************************************/
#include <stdio.h>
#include <stdlib.h>
#include <string.h>
#include <fcntl.h>
#include <sys/types.h>
#include <errno.h>
/*************************************************/
/* getKsym                                       */
/*                                               */
/* This function takes in a symbol name and      */
/* checks to see if a checksum is included in    */
/* the name. If no checksum is found, the        */
/* original name is returned. If a checksum is   */
/* found, it is stripped off and the current     */
/* kernel is searched for this symbol name       */
/* using /proc/ksyms. If found, it               */
/* replaces the old checksum with the new one    */
/* and return the new name. If not found, NULL   */
/* is returned.                                  */
/*************************************************/
char * getKsym( char * name )
{
   FILE * fp;
   char Symbol[256];
   char StripSymbol[256];
   char * new_symbol = NULL;
   char temp[20];
   /* check to see if checksum is present */
   if ( strstr ( name, "_R" ) && strlen ( strstr ( name, "_R" ) )
== 10 )
      strncpy ( StripSymbol, name, strlen ( name ) - 10 );
   else
      return name;
   /* strip off the checksum */
   StripSymbol[strlen (name) - 10] = '\0';
   /* open up the /proc/ksyms */
   fp = fopen ( "/proc/ksyms", "r" );
   if ( ! fp )
   {
      perror("open : /proc/ksyms" );
      return NULL;
   }
   /* Loop through the /proc/ksyms for the symbol */
   while ( fgets ( Symbol, 256, fp ) )
   {
      char * ptr;
      char * tempSymbol;
      tempSymbol = ( char * ) malloc ( 256 );
      Symbol [strlen(Symbol)-1] = '\0';
      strcpy ( tempSymbol, Symbol + 9 );
      /* See if we have a possible match */
      if ( ! strstr ( tempSymbol, StripSymbol ) )
         continue;
      /** Check to see if this has a hash **/
      ptr = strstr ( tempSymbol, "_R" );
      if ( ! ptr )
         continue;
      if ( strlen ( ptr ) != 10 )
         continue;
      /** The hash is stripped off so we can check the exact symbol
name **/
      /* This is an exact check for a match after the preliminary
checks */
      tempSymbol [strlen(tempSymbol) -10] = '\0';
      if ( strcmp ( tempSymbol, StripSymbol ) != 0 )
         continue;
      /** We found a match, so go ahead and append the new
       *  checksum onto the old symbol name
       *  and return it.
       */
      free ( tempSymbol );
      new_symbol = malloc ( strlen ( Symbol + 9 ) + 1 );
      strcpy ( new_symbol, Symbol + 9 );
      break;
   }
   fclose ( fp );
   return new_symbol;
}
```

The above specific embodiments are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

For example, although version identification modification follows symbol table modification in the embodiment described above, the module information modification may precede the error check adjustment. As another example, although the software utility may run on the target system, the kernel module modification apparatus may be adapted to run on a system (having at least a processor and a program storage device) other than the target system, if the kernel version identification of the target system is known and the error check measure of the kernel on the target system also is available.

Additional variations may be apparent to one of ordinary skill in the art from reading U.S. Provisional Application No. 60/373,120, filed Apr. 17, 2002, which is incorporated herein in its entirety by reference.

What is claimed is:

1. A kernel module modification apparatus stored on a computer readable medium and operable to be executed on a computer for adapting for a kernel on a target system a compile kernel module corresponding to another kernel version which is different from the kernel on the target system, comprising:
   a kernel analyzer adapted to extract from the kernel on the target system an error check measure and a kernel version identification; and
   a module adaptation component adapted to insert in the compiled kernel module an error check parameter corresponding to the error check measure extracted by the kernel analyzer from the kernel on the target system, and to replace a version identification in the compiled kernel module with the kernel version identification extracted by the kernel analyzer from the kernel on the target system.

2. The apparatus of claim 1, wherein the compiled kernel module into which the error check parameter is inserted is binary.

3. The apparatus of claim 1, wherein the modified, compiled kernel module, which has inserted therein the error check parameter and bears the kernel version identification extracted from the kernel on the target system, is loadable into the kernel on the target system.

4. The apparatus of claim 1, wherein the error check measure includes one or more checksums extracted by the kernel analyzer from the kernel on the target system.

5. The apparatus of claim 1, wherein the kernel analyzer locates a symbol table in the compiled kernel module and, for each symbol name in the symbol table, performs an analysis of the symbol name.

6. The apparatus of claim 5, wherein the symbol name analysis performed by the kernel analyzer includes comparing the symbol name to symbols in the kernel on the target system.

7. The apparatus of claim 6, wherein if the symbol name is matched to a symbol in the kernel on the target system, the kernel analyzer extracts a checksum associated with the matched symbol and the module adaptation component appends the extracted checksum to the symbol name in the symbol table of the compile kernel module.

8. The apparatus of claim 5, wherein the module adaptation component adjusts one or more offsets of the symbol table, after the symbol names are analyzed.

9. The apparatus of claim 1, wherein the compiled kernel module is a loadable Linux kernel module.

10. A computer-implemented method for adapting for a kernel on a target system a compiled kernel module corresponding to another kernel version which is different from the kernel on the target system, comprising:
   extracting from the kernel on the target system an error check measure and a kernel version identification;
   inserting in the compiled kernel module an error check parameter corresponding to the error check measure extracted from the kernel on the target system; and
   replacing a version identification in the compiled kernel module with the kernel version identification extracted from the kernel on the target system.

11. The method of claim 10, wherein the compiled kernel module into which the error check parameter is inserted is binary.

12. The method of claim 10, wherein the modified, compiled kernel module having inserted therein the error check parameter and bearing the kernel version identification extracted from the kernel on the target system is loadable into the kernel on the target system.

13. The method of claim 10, wherein the extracted error check measure includes one or more checksums extracted from the kernel on the target system.

14. The method of claim 10 further comprising locating a symbol table in the compiled kernel module and, for each symbol name in the symbol table, performing an analysis of the symbol name.

15. The method of claim 14, wherein the symbol name analysis includes comparing the symbol name to symbols in the kernel on the target system.

16. The method of claim 15, wherein if the symbol name is matched to a symbol in the kernel on the target system, a checksum associated with the matched symbol is extracted and then appended to the symbol name in the symbol table of the compiled kernel module.

17. The method of claim 14, wherein offsets of the symbol table are adjusted after the symbol names are analyzed.

18. The method of claim 10, wherein the compiled kernel module is a loadable Linux kernel module.

19. A system, comprising:
   a program storage device readable by a processor, tangibly embodying a program of instructions executable by the processor; and
   the processor operable to:
      extract from a kernel on a target system an error check measure and a kernel version identification;
      insert in a compiled kernel module an error check parameter corresponding to the error check measure extracted from the kernel on the target system; and
      replace a version identification in the compiled kernel module with the kernel version identification extracted from the kernel on the target system.

20. A program storage device readable by a machine, tangibly embodying a program of instructions executable by the machine to:
   extract from a kernel on a target system an error check measure and a kernel version identification;
   insert in a compiled kernel module an error check parameter corresponding to the error check measure extracted from the kernel on the target system; and
   replace a version identification in the compiled kernel module with the kernel version identification extracted from the kernel on the target system.

21. A computer data signal embodied in a transmission medium which embodies instructions executable by a computer to
   extract from a kernel on a target system an error check measure and a kernel version identification;
   insert in a compiled kernel module an error check parameter corresponding to the error check measure extracted from the kernel on the target system; and
   replace a version identification in the compiled kernel module with the kernel version identification extracted from the kernel on the target system.

* * * * *